(12) United States Patent
Schulter et al.

(10) Patent No.: US 6,222,362 B1
(45) Date of Patent: Apr. 24, 2001

(54) METHOD FOR DETECTING THE POSITION AND DIRECTION OF MOTION OF A MOVING PART MOUNTED ON AN ELECTRIC MOTOR

(75) Inventors: Wolfgang Schulter, Meersburg; Dieter Driendl, Deggenhausertal; Erwin Kessler, Saulgau-Bolstern; Stephan Kimpfler, Oberteuringen; Kurt Kleiner, Messkirch, all of (DE)

(73) Assignee: Temic Telefunken Microelectronics GmbH, Heilbronn (DE)

( * ) Notice: Subject to any disclaimer, the term of this patent is extended or adjusted under 35 U.S.C. 154(b) by 0 days.

(21) Appl. No.: 09/127,633

(22) Filed: Aug. 3, 1998

(30) Foreign Application Priority Data

Aug. 2, 1997 (DE) .............................................. 197 33 581

(51) Int. Cl.$^7$ .............................. G01P 13/00; G01P 3/44; G01B 7/30; H02K 11/00
(52) U.S. Cl. .................... 324/207.25; 324/165; 324/166; 324/177; 310/68 B; 318/466
(58) Field of Search ........................... 324/160, 163–166, 324/177, 207.25; 310/68 B, 68 C; 318/466, 490, 799, 805, 282, 293; 388/909, 928.1; 340/672

(56) References Cited

U.S. PATENT DOCUMENTS 4,091,314 * 5/1978 Johnson ........................... 324/165 X

FOREIGN PATENT DOCUMENTS

| 3834017 | * 4/1990 | (DE) | ..................................... 324/177 |
| 4315637C2 | 11/1994 | (DE) . | |
| 0359853B1 | 3/1990 | (EP) . | |
| 0603506A2 | 6/1994 | (EP) . | |
| 63-304307 | 12/1988 | (JP) . | |

* cited by examiner

*Primary Examiner*—Gerard R. Strecker
(74) *Attorney, Agent, or Firm*—Venable; George H. Spencer; Norman N. Kunitz

(57) ABSTRACT

A method is presented for detecting the position and the direction of motion of a movably mounted part on an electric motor that makes provision not only for a single-channel sensor but also a measuring arrangement for the motor current and the rectified motor current by means of which the motor current is activated after operating switching devices to reverse the polarity of the voltage applied to the motor to cause a reversal of the direction of motion. The measuring arrangement establishes from the variation of the motor current over time the point of time of the motor current maximum and transmits this to the evaluation logic. The point of time of the actual reversal of the direction of motion is derived from the point of time of the motor current. Preferably, the current is measured as a reference current value even before falling through the zero crossing. By means of a calculating unit that simulates a motor state model, the measured values of motor current, motor voltage and motor speed can also be used to ascertain by calculation the time of reversal of the direction of motion and the current threshold value.

10 Claims, 2 Drawing Sheets

METHOD FOR DETECTING THE POSITION AND DIRECTION OF MOTION OF A MOVING PART MOUNTED ON AN ELECTRIC MOTOR

BACKGROUND OF THE INVENTION

The invention relates to a method for detecting the position and the direction of motion of a movably mounted part that can be used in particular for the externally powered adjustment of closing parts in motor vehicles, e.g. on an electrically driven window lifter with an anti-jamming function.

Known devices for the detection of position and direction of rotation make use of two-channel sensor systems whose signals are phase-shifted and evaluated in an electronic unit. The sensors used can operate in accordance with very different physical principles (e.g. electrical, magnetic, inductive, optical).

For example, the electric motor drive specified in EP 0 359 853 A1 makes use of two Hall sensors displaced at an angle to each other and allocated to a ring magnet attached to the armature shaft. When the armature shaft rotates, the Hall sensor generates two correspondingly phase-shifted signals that are digitized and then evaluated in an electronic unit and thereafter represent the only foundation for identifying the direction of rotation. Since the corresponding signal pattern is characteristic (different) for each direction of rotation, the count pulses can equally be uniquely assigned to a direction of rotation.

Because the known technical solution requires no fewer than two sensor channels, however, it needs a correspondingly high number of components and conductors for its implementation. Also, the construction space is to be kept free for it can have a negative effect, especially when using small drive units with integrated electronics.

From JP 63-30 43 07 A, a velocity control for a motor drive is known where the phase difference between a velocity control pulse and the incremental pulse of a laser length measuring device is continuously acquired. The control loop used also has a pulse converter and a mechanism for transforming the rotary motion of the motor into a linear motion. An up or a down signal is generated in a transformer from the measurement of the linear motion in accordance with the direction of the positioning command.

The solution described does indeed permit very accurate control of the adjustment velocity of an object but it is not suitable for establishing at the same time its position. Further measures must be provided for this purpose.

Furthermore, from DE 43 15 637 C2, a method for detecting the position and direction of rotation is known, where not only the signal edges of the digitized sensor signal but also the status of the drive is allowed for in that in the event of reversal of the direction of rotation the signal edges are assigned in accordance with an overshoot time that is limited by fixed time thresholds which can be determined empirically or calculated mathematically. Adaptation to the widely varying system conditions is not possible because the variation of the motor current over a period of time while the direction of rotation reverses varies by several orders of magnitude. In particular, a control with fixed thresholds is always limited only to a specific load case which is essentially determined by the mass moment of inertia to be overcome. A rise due, for instance, to a window pane freezing or jamming does lead to deviations. In motor vehicles, the operating supply voltage can certainly drop considerably if the battery is low and other load elements are also being operated. If the motor is used very frequently, as for example in the case of actuating drives on industrial machine tools, the electrical parameters of the motor also change because of the warming effect. If the time thresholds were to be placed so far apart that all these cases could still be measured, then a particularly smooth running actuator arrangement would perform several revolutions in the opposite direction before being detected by the threshold.

EP 0 603 506 A2 describes a method for determining with a position encoder the position of a part driven in two directions by an electric motor in motor vehicles, where a change in direction is to be identified according to the duration of a break period between two pulses from the position encoder. Errors can occur in such a method due to rapid change of direction or if the motion of the part is non-uniform and does not take place in step form in a single step.

It is also known that the behavior of d.c. motors can be described by means of an electromechanical motor state model based on the motor equations. The motor equation $U_q(t)=c_2 \cdot \Phi \cdot n(t)$, also known as generator equation, and the motor equation $M_m(t)=c_1 \cdot \Phi \cdot I_M(t)$ as well as the electrical relationship $$U_q(t) = U_M(t) - I_M(t) \cdot R_a - L \cdot \frac{\partial I_M(t)}{\partial t}$$

is also to be found in literature, for instance Lindner and others: Reference material Elektrotechnik—Elektronik, Leipzig, 2. printing 1983, p. 199 ff. The reference symbols signify the following: $U_q$ induced voltage; $c_1$, $c_2$ motor constants; $\Phi$ magnetic flux; n rotational speed; $M_L$ load moment; $M_m$ motor moment; $M_B$ the acceleration moment resulting from the motor moment; $I_M$ motor current; $U_M$ motor terminal voltage; $R_a$ armature resistance; $R_k$ external terminal resistance; L inductance of the motor winding; J mass moment of inertia of the entire rotating arrangement including the parts to be moved, such as the windows, for example.

SUMMARY OF THE INVENTION

The invention demonstrates a method for detecting the position and the direction of motion of a movably mounted part on an electric motor and which automatically adapts to the present state of the motor.

The motor current is measured, by means of a measuring arrangement (FIG. 1), starting at least upon driving the switching devices to switch the motor voltage from one direction of motion to the opposite direction. The time $T+\Delta t_s$ at which the maximum of the motor current is reached corresponds approximately to the time $T+\Delta t_R$ at which the direction reverses and the signal edges related by addition or subtraction to the actual position accordingly by the evaluation logic. The essential point here is not that an amplitude value is preset but that preferably a maximum is determined.

Preferably therefore, the motor current maximum is obtained by comparing two adjacent sampling values. Furthermore, a current threshold value is specified beneath which current peaks, that might arise for example as a result of interference, are ignored and only that motor current maximum which exceeds the current threshold value is signaled to the evaluation unit By means of a reference current value $I_{a0}$ immediately before the motor current drops as it begins a polarity change, the current threshold value can also be determined as an actual value and be adapted to the respective load state of the motor. In order to establish the time $T+\Delta t_s$ at which the current maximum drops after the change of sign, the difference between two adjacent sampling values of the motor current is always compared with a specified difference value when the current threshold value is exceeded.

The measured reference current value $I_{a0}$, the actual rotational speed and motor voltage, as well as the model parameters of the motor can be employed in order to ascertain the current threshold value precisely.

Preferably, the calculating unit simulates a motor state model such as that which the expert obtains by conversion from the motor equations. In order to determine the current threshold value on reversal of the direction of motion, it is assumed that the load moment varies only by an insubstantial amount over the time while passing through zero.

Preferably, the physical quantities of the motor state model that no longer vary after the actuating motor has been installed are preset, for instance by programming at the time of installation. By measuring motor current and voltage at the starting time point, before the static friction has been overcome, the ohmic resistance can also be determined to a very good degree of approximation because no voltage has yet been induced.

In order to ascertain the motor current at the point of time at which the rotational speed becomes zero, the expert can simplify the physically theoretical motor state model defined by the motor equations in that, in place of the second order differential equation through which the step response of the speed is characterized, he checks the time constants and amplitudes of the various poles with respect to their sizes and possibly ignores the pole with the least influence on the result. Furthermore, in place of the differential equation, the zero point of the speed can be approached in steps by an iterative method with a differential equation. The amount of calculation to be performed by the calculating unit is thus reduced considerably.

Because the measuring arrangement measures the rectified motor current instead of the motor current, the type of reversal of the motion of direction need not be considered and the measuring arrangement can be applied identically for both cases. For this purpose, a resistor is arranged behind the switching elements towards the reference potential (ground).

DESCRIPTION OF THE PREFERRED EMBODIMENTS

Figure 1:
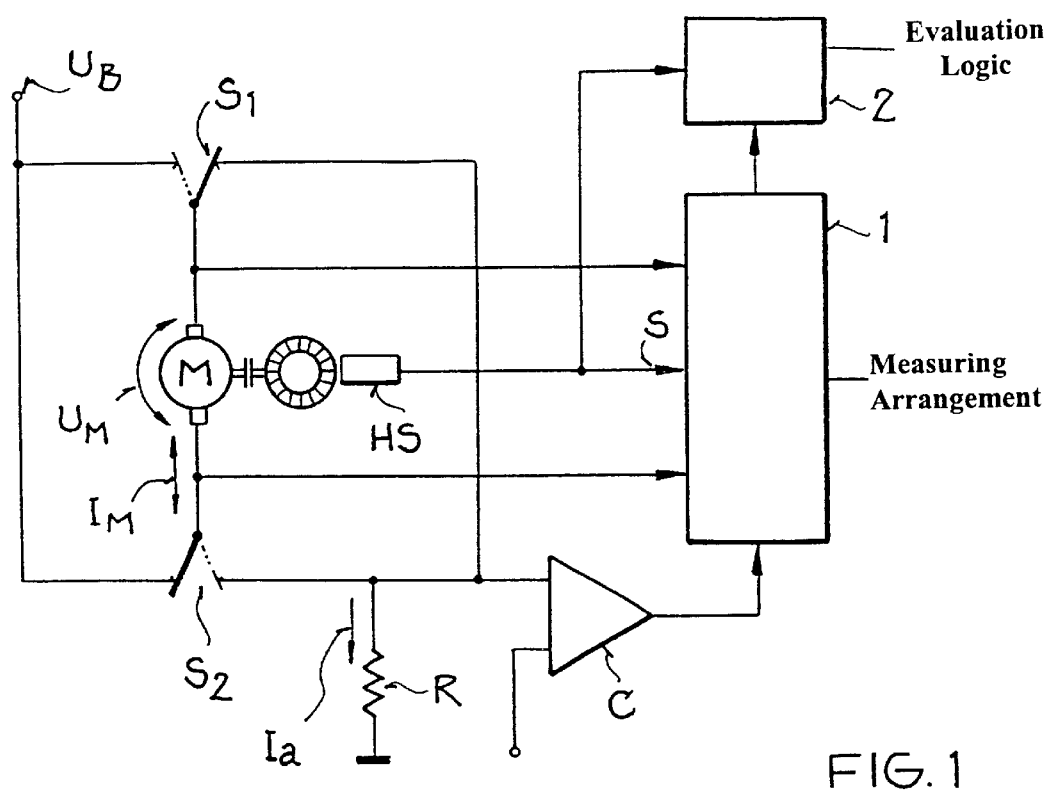
FIG. 1 Schematic diagram of the circuit arrangement of the motor and the motor control FIG. 2 Time diagram of the main system variables

FIG. 1 shows a schematic diagram of the circuit arrangement of the motor M and the motor control. The motor M is connected to the operating voltage source $U_B$ via the two switches $S_1$, $S_2$ on the one side and to the reference potential (ground) through the resistor R on the other side, whereby in each case precisely one switch (in FIG. 1 this is $S_2$) is connected towards the operating voltage source $U_B$ and the other switch ($S_1$) towards the reference potential (ground). In order to switch off the motor, both switches $S_1$, $S_2$ are connected to reference potential (ground) so that the motor voltage $U_M$ across the motor is zero. The motor M has a rotor and an associated Hall sensor HS which supplies the digital signal S directly to the evaluation logic 2 and to the measuring arrangement 1. The measuring arrangement is also connected to the evaluation logic 2. The measuring arrangement 1 measures the motor voltage $U_M$ and the rectified motor current $I_a$ by amplifying with an amplifier C the voltage drop which occurs across the resistor R. The resistor R, as pick-up element of the motor current, is connected between the reference potential (ground) and the switches $S_1$, $S_2$ so that the motor current $I_a$, measured by the resistor R, is rectified as compared with the motor current $I_M$ flowing between the switches $S_1$ and $S_2$. Consequently, the following measuring arrangement 1 is independent of the type of reversal of the direction of motion. In this circuit, the resistor R acts as a shunt and is chosen with a low ohmic value in order to minimize the power losses. The voltage across the resistor R, proportional to the rectified motor current $I_a$, must therefore be appropriately amplified for processing in the measuring arrangement 1.

The mode of operation of the arrangement will now be explained for the reversal of direction that is of essential significance for the invention with reference to FIG. 2.

Figure 2:
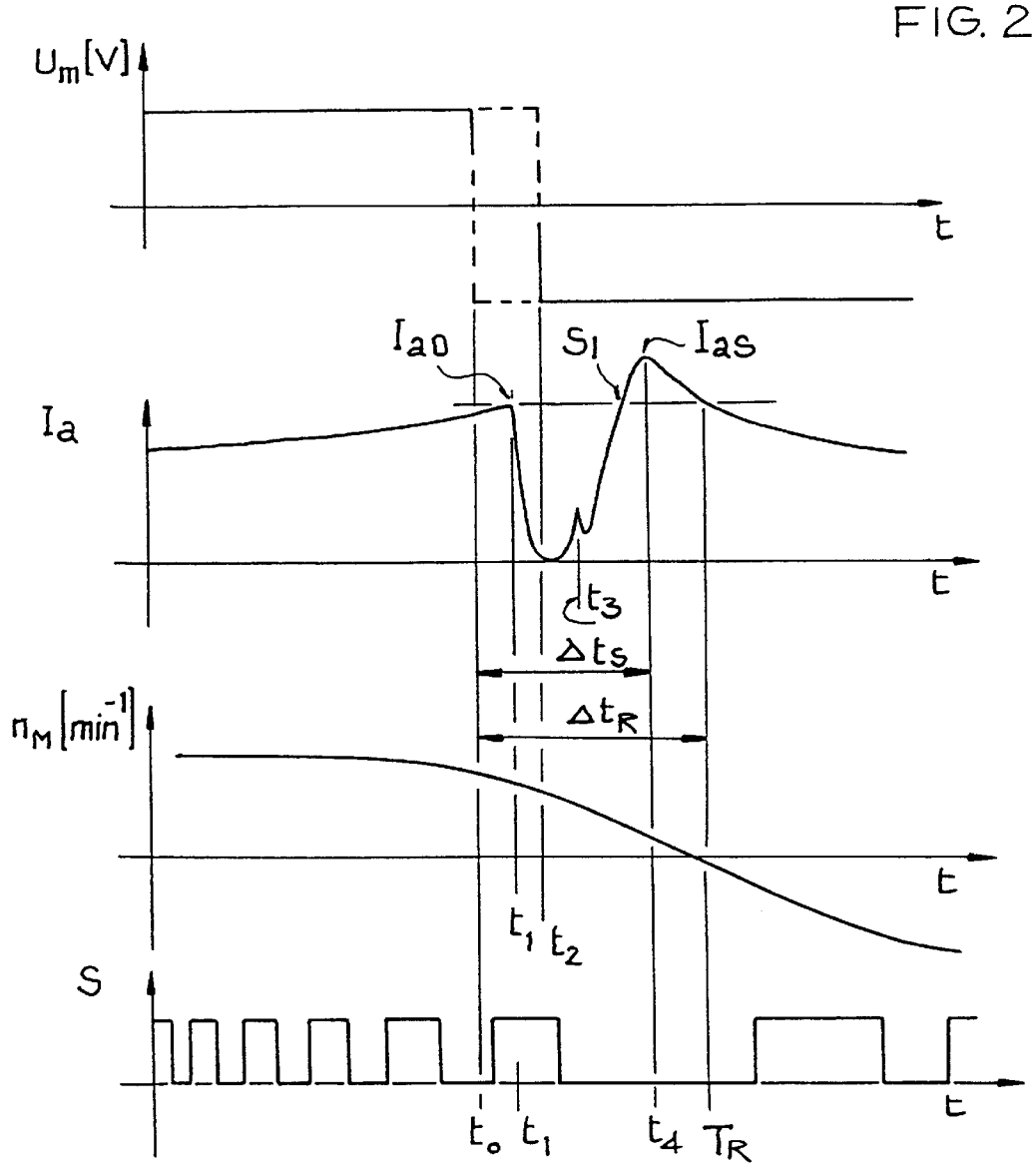

FIG. 2 shows the variation with respect to time of the motor voltage $U_M$, the rectified motor current $I_a$, the rotational speed $n_M$ and the signal S of the Hall sensor during the reversal of rotation. The speed $n_M$ reaches the zero point at time $T_R$ only after an overrun time $\Delta t_R$. The signal S of the Hall sensor specifies with its signal edges in each case one revolution of the rotor and thus of the movably mounted part.

At time to the command for reversal of the direction of motion is issued to switches $S_1$, $S_2$, whereupon the effective motor voltage $U_M$ responds with a certain delay (indicated by a dotted line). At time $t_2$ both switches reach the respective opposite switching point. Consequently, at time $t_1$ there is a drop of the motor current $I_M$ as it begins a change of polarity, and the rectified current $I_a$ goes to zero as the motor current $I_M$ undergoes a zero crossing. The rectified motor current $I_a$ is measured by the measuring arrangement 1. The $I_a$ drop is detected by the measuring arrangement 1 and the reference current value $I_{a0}$ at time $t_1$ is determined as the last sampling value before the drop. The measuring arrangement 1 already measures the rectified motor current $I_a$ no later than the time of the command for reversing the direction of motion ($t_0$). Naturally, permanent measurement of the motor current $I_M$ or of the rectified motor current $I_a$ is conceivable, provided this appears sensible for another application. The measuring arrangement detects the occurrence of the drop by directly following value of motor current being smaller by a specified difference than the preceding value.

The current threshold value $S_I$ serves to exclude premature local current maxima caused by interference and can indeed be preset even in the simplest case, but it is preferably derived from the reference current value $I_{a0}$ in order to allow better matching to the loading state of the motor M. The time $T_R$ of the reversal of the direction of motion can also be determined in that the calculating unit simulates a motor state model and the time is determined at which the speed reaches zero. The motor state model can cover the physical theoretical motor state model in the form of the second order differential equation for which the time of the zero point of the rotational speed is determined for a voltage jump of ±2 $U_B$ for corresponding actual values of speed and motor voltage. The essential point here, however, is that the load moment does not change, or at least only by an insubstantial amount, over the period of reversal. Otherwise, the load moment would also have to be specified for the calculation because it cannot be ascertained from the behavior of motor current and voltage in the transitional region. The amount of calculation for the motor state model can be simplified further by using constants and a differential equation while at the same time neglecting terms with small amplitude and slow time constants.

In the most extreme simplification, the current threshold value $S_I$ results directly from a reference current value $I_{a0}$ which is determined from the motor current $I_M$ immediately before dropping into the sign change, so that the measured reference current value $I_{a0}$ specifies the current threshold value $S_I$ for the selection of the following motor current maximum $I_{as}$ in order to permit better matching to the loading state of the motor M.

The time $t_4$ of the motor current maximum $I_{as}$ is always determined after the change of sign of the motor current $I_M$ or after the zero point of the rectified motor current $I_a$. Preferably, a comparison is made here of two adjacent sampling values of the motor current. In order to avoid errors due to interference, such as small local minima, at time $t_3$ as indicated in FIG. 2, preferably only that current maximum which is above the threshold value $S_I$ is sent to the evaluating unit 2. The underlying principle of the invention is to determine the time $T_R$ of the reversal of the direction of motion in relation to the time $t_4$ of the motor current maximum $I_{as}$. This is done, for example, by providing a specified table in which the period $\Delta t_R$ between the time $t_o$ of the command for changing the direction of motion and time of the motor current maximum $I_{as}$ is assigned a period $\Delta t_R$ between the time $t_o$ of the command for changing the direction of motion and the time for reversal of the direction of motion $T_R$.

What is claimed is:

1. A method for determining the moment of direction reversal, forcibly achieved through switching of the motor voltage, for an electric motor comprising
    a) measuring the motor current from at least the moment of a command to switch the motor voltage,
    b) monitoring the measured value of motor current to detect a change in polarity and a following motor current maximum, and
    c) determining the moment for the direction reversal from the moment in time of this motor current maximum.

2. A method according to claim 1, wherein
    a) a first time interval is determined as a time difference between the moment for the command to switch the motor voltage and the moment of this motor current maximum,
    b) a second time interval representing the time difference between the moment of the command for switching the motor voltage and the moment for the direction reversal is determined from a specified table in which said second time interval is assigned to said first time interval, and
    c) the moment in time for the direction reversal is derived from said second time interval.

3. A method according to claim 1, wherein
    a) a motor state model is reconstructed in a calculating unit from the equations $$U_q(t)=c_2 \cdot \Phi \cdot n(t); M_m(t)=c_1 \cdot \Phi \cdot I_M(t)$$

and $$U_q(t) = U_M(t) - I_M(t) \cdot R_n - L \cdot \frac{\delta I_M(t)}{\delta t}$$

in which $U_q(t)$ is the voltage induced in the motor, $c_1$ and $c_2$ are motor constants, $\Phi$ is magnetic flux in the motor, n is rotational speed of the motor, $M_m$ is motor moment, $I_M$ is the motor current, $U_M$ is the motor voltage, $R_n$ is the armature resistance of the motor, L is the inductance of the motor winding, b) wherein it is assumed that the load moment acting upon the motor changes only insignificantly following said change in polarity, and c) wherein said moment of direction reversal is determined by means of said motor state model.

4. A method according to claim 1 wherein the motor current maximum is used for determining the moment of direction reversal only if it exceeds a predetermined current threshold value.

5. A method according to claim 4 wherein
    a) a reference current value is determined as that value of motor current which occurs just before the motor current drops for a polarity change and
    b) for each reversal of the movement direction, the current threshold value is derived anew from the respectively current reference current value.

6. A method according to claim 5 wherein the reference current value is determined if a directly following value of motor current is smaller by a specified difference value than the preceding current value.

7. A method according to claim 5 wherein the current threshold value in each case is set equal to the actual reference current value.

8. A method according to claim 4, wherein
    a) the motor current, the motor voltage and the motor speed are detected prior to the polarity change of motor current
    b) wherein it is assumed that the load moment acting upon the motor changes only insignificantly following the polarity change of motor current,
    c) immediately prior to the drop for said polarity change, a current reference value is determined from the actual value of motor current, the motor voltage and the motor speed, and
    d) the current threshold value is derived from this current reference value.

9. A method according to claim 3 wherein the calculating unit predetermines at least the physical variables $2\pi J$ and $c\Phi$ wherein J stands for the mass moment of inertia of the complete rotating arrangement of the motor and wherein c stands for a motor constant and $\Phi$ for the magnetic flux.

10. A method according to claim 3, wherein the calculating unit, approximately determines the ohmic resistance of motor from the motor voltage, divided by the motor current for each start-up of the motor from the standstill prior to overcoming the static friction.

* * * * *